(12) United States Patent
Hoeks et al.

(10) Patent No.: US 7,390,450 B2
(45) Date of Patent: Jun. 24, 2008

(54) PROCESS FOR PREPARING A FIRE RESISTANT POLYCARBONATE COMPOSITION

(75) Inventors: Theodorus Lambertus Hoeks, Bergen op Zoom (NL); Adrianus A. M. Kusters, Chaam (NL)

(73) Assignee: General Electric Company, Schenectady, NY (US)

( * ) Notice: Subject to any disclaimer, the term of this patent is extended or adjusted under 35 U.S.C. 154(b) by 97 days.

(21) Appl. No.: 10/064,073

(22) Filed: Jun. 7, 2002

(65) Prior Publication Data

US 2003/0229165 A1 Dec. 11, 2003

(51) Int. Cl.
 B32B 27/18 (2006.01)
 B32B 27/28 (2006.01)
 B32B 15/082 (2006.01)
 C08K 5/41 (2006.01)

(52) U.S. Cl. .............. 264/171.13; 264/173.12; 264/173.16; 264/241; 524/157; 524/158; 524/161; 524/162; 524/163; 524/164; 524/166; 524/537

(58) Field of Classification Search .......... 524/157, 524/158, 161, 162, 163, 164, 166, 537; 264/171.13, 264/173.12, 173.16, 241
See application file for complete search history.

(56) References Cited

U.S. PATENT DOCUMENTS

| | | | | |
|---|---|---|---|---|
| 3,635,895 A | 1/1972 | Kramer | ........... | 260/47 XA |
| 3,775,367 A | 11/1973 | Nouvertne | ........... | 260/45.9 R |
| 3,956,538 A * | 5/1976 | Vartiak | ........... | 427/343 |
| 4,001,184 A | 1/1977 | Scott | ........... | 260/47 XA |
| 4,028,297 A | 6/1977 | Webb | ........... | 260/37 PC |
| 4,110,299 A | 8/1978 | Mark | ........... | 260/37 PC |
| 4,113,695 A * | 9/1978 | Mark | ........... | 524/163 |
| 4,130,530 A | 12/1978 | Mark et al. | ........... | 260/29.1 SB |
| 4,154,692 A * | 5/1979 | McElveen | ........... | 252/608 |
| 4,217,438 A | 8/1980 | Brunelle et al. | ........... | 528/202 |
| 4,289,685 A * | 9/1981 | Druschke et al. | ........... | 523/333 |
| 4,303,575 A | 12/1981 | Reinert | ........... | 260/45.8 A |
| 4,335,038 A | 6/1982 | Thomas | ........... | 524/188 |
| 4,404,303 A * | 9/1983 | Thomas | ........... | 524/100 |
| 4,552,911 A | 11/1985 | Cohnen et al. | ........... | 524/94 |
| 4,600,742 A * | 7/1986 | Higgins | ........... | 524/166 |
| 4,735,978 A * | 4/1988 | Ishihara | ........... | 524/162 |
| 4,916,194 A | 4/1990 | Policastro et al. | ........... | 525/433 |
| 5,218,027 A | 6/1993 | Smith et al. | ........... | 524/265 |
| 5,508,323 A | 4/1996 | Romenesko et al. | ........... | 523/212 |
| 6,174,944 B1 * | 1/2001 | Chiba et al. | ........... | 524/127 |
| 6,353,046 B1 | 3/2002 | Rosenquist et al. | | |
| 6,518,347 B1 * | 2/2003 | Boyd et al. | ........... | 524/395 |
| 6,547,655 B1 * | 4/2003 | Schaffner | ........... | 451/466 |

FOREIGN PATENT DOCUMENTS

| | | |
|---|---|---|
| EP | 0 374 816 | 12/1989 |
| EP | 0 625 547 | 5/1994 |
| WO | WO 00/46299 | 8/2000 |

* cited by examiner

*Primary Examiner*—Ana L Woodward
(74) *Attorney, Agent, or Firm*—Cantor Colburn LLP

(57) ABSTRACT

A process for producing a fire resistant polycarbonate composition comprises preparing an aqueous solution of a flame retardant salt; and compounding the aqueous solution of the flame retardant salt with a polycarbonate composition to form the fire resistant polycarbonate composition. The process reduces the level of haze, color and inclusions compared to fire resistant polycarbonate compositions compounded with the same flame retardant salt in solid form.

15 Claims, 2 Drawing Sheets

CONVENTIONAL INTERFACIAL

MELT

PROCESS FOR PREPARING A FIRE RESISTANT POLYCARBONATE COMPOSITION

BACKGROUND

This disclosure relates to methods for producing transparent, fire resistant polycarbonate compositions and more particularly, to methods for producing transparent, fire resistant polycarbonate compositions comprising flame retardant salts.

Plastics, and in particular aromatic polycarbonates, are increasingly being used to replace metals in a wide variety of applications, from car exteriors to aircraft interiors. The use of plastics instead of metal decreases weight, improves sound dampening, and makes assembly of the device easier. Unfortunately, polycarbonates are inherently flammable, and thus require the addition of flame retardants. A variety of different flame retardant materials have been used, some of which are set forth in U.S. Pat. Nos. 4,028,297; 4,110,299; 4,130,530; 4,303,575; 4,335,038; 4,552,911; 4,916,194; 5,218,027; and 5,508,323. The challenge is to identify economical, environmentally friendly flame retardant materials that provide the requisite flame resistance, but without compromising desirable polycarbonate properties such as strength, color, and clarity.

There are three general processes known for the commercial manufacture of aromatic polycarbonates, which are illustrated in FIG. 1. The conventional interfacial process, as shown in FIG. 1A, and the phosgene-based melt process, as shown in FIG. 1B, start with the reaction of chlorine with carbon monoxide to produce phosgene. The third general process, a "no phosgene" melt process as shown in FIG. 1C, was developed to eliminate the use of phosgene in the process flow. Of these general methods, the "no phosgene" melt process shown in FIG. 1C is preferred since it prepares polycarbonates less expensively than the interfacial process and avoids the use of highly toxic phosgene.

Both types of melt processes (FIGS. 1B, and 1C) make use of a diarylcarbonate, such as diphenylcarbonate (DPC) as an intermediate, which is polymerized with a dihydric phenol such as bisphenol A (BPA) in the presence of an alkaline catalyst to form a polycarbonate in accordance with the general reaction scheme shown in FIG. 2. This polycarbonate may be extruded or otherwise processed, and may be combined with additives such as flame retardants, dyes, blowing agents, light stabilizers, fillers, reinforcing agents, heat stabilizers, antioxidants, plasticizers, antistatic agents, mold releasing agents, an additional resin, or combinations comprising at least one of the foregoing additives.

In the production of polycarbonates, several reactors are typically used in sequence to prepare the final product. The final reactors in this sequence subject the reaction mixture to both high temperature and high vacuum. This treatment assists in the removal of byproduct phenol, unreacted monomer and short oligomers, improving the overall quality of the final product. For products requiring flame resistance, flame retardant is typically added after the final target specifications of the polycarbonate composition have been met (e.g., molecular weight, % branching, etc.). The polycarbonate composition can then be palletized or may be fed as a polymer melt to a compounder where the additives are combined with the polycarbonate composition and extruded or injection molded into the desired product, e.g., sheet. There are many different types of flame retardants including the use of flame retardant inorganic salts. The flame retardant salts are typically added in solid form as milled or unmilled powders.

It is well known that compounding flame resistant salts in solid form with the polycarbonate composition can produce surface imperfections (i.e., inclusions) in the extruded product as well as impart haze. Some flame retardant salts have a melting temperature greater than the compounding and processing temperatures employed that can directly contribute to the severity and amount of inclusions. For example, potassium diphenylsulfon-3-sulfonate is a flame retardant salt as disclosed, for example, in U.S. Pat. No. 4,735,978, having a melting temperature greater than about 350° C. During the compounding and processing of the polycarbonate composition, the temperatures are typically maintained less than about 300° C., temperatures considerably less than the melting temperature of KSS. As a result, KSS functions similar to a filler material when added to the polycarbonate extrudate in the reactors. That is, particles of KSS are distributed throughout the polycarbonate composition in order to impart the desired flame resistance to the extruded product. As one would expect, the size of the flame retardant salt particles can affect the amount of haze produced in the extruded product. Milling the flame retardant salt into smaller particles can help reduce the level of haze. However, for applications requiring optical quality, the reduction in haze may not be sufficient for the desired application (to justify the expense of milling). Moreover, milling does not reduce the level of imperfections produced in the fire resistant polycarbonate by any significant amount.

Accordingly, there remains a need in the art for methods of producing polycarbonates that are not only highly flame resistant, but also transparent and do not produce surface imperfections.

BRIEF SUMMARY

In one embodiment, a process for producing a fire resistant polycarbonate composition comprises preparing an aqueous solution of a flame retardant salt; and compounding the aqueous solution of the flame retardant salt with a polycarbonate composition to form the fire resistant polycarbonate composition. Depending on the selection of the flame retardant salt, the aqueous solution may optionally include an alcohol, e.g., methanol, butanol, ethanol, propanol, isopropanol, and the like alcohols. The flame retardant salt preferably has a melting temperature greater than a compounding temperature for fanning the fire resistant polycarbonate composition. The flame retardant salt is preferably selected from the group consisting of sodium or potassium perfluoromethylbutane sulphonate; sodium or potassium perfluoromethane sulphonate; sodium or potassium periluoroethane sulphonate; sodium or potassium perfluoropropane sulphonate; sodium or potassium perfluorohexane sulphonate; sodium or potassium peufluoroheptane sulphonate; sodium or potassium perfluoroctane_sulphonate; sodium or potassium perfluorobutane sulphonate; sodium or potassium trichlorbenzoate sulfonate; sodium or potassium dichlorbenzoate sulfonate; sodium or potassium tosylsulphonate; and sodium or potassium diphenylsulfon-3-sulphonate; and combinations comprising at least one of the foregoing salts.

A process for reducing haze in a fire resistant polycarbonate composition comprises compounding an aqueous solution of a aromatic sulfonate or aromatic benzoate flame retardant salt with a polycarbonate composition to form the fire resistant polycarbonate composition, wherein the haze is reduced compared to compounding the flame retardant salt in solid form with the polycarbonate composition.

A process for reducing color comprises compounding an aqueous solution of an aromatic sulfonate or aromatic benzoate flame retardant salt with a polycarbonate composition to form the fire resistant polycarbonate composition, wherein a yellowness index is reduced compared to compounding the flame retardant salt in solid form with the polycarbonate composition.

A process for reducing inclusions comprises compounding an aqueous solution of a aromatic sulfonate or aromatic benzoate flame retardant salt with a polycarbonate composition to form the fire resistant polycarbonate composition, wherein the number of inclusions is reduced compared to compounding the flame retardant salt in solid form with the polycarbonate composition.

These and other features will become better understood from the detailed description that is described in conjunction with the accompanying drawings.

BRIEF DESCRIPTION OF THE DRAWINGS

Referring now to the figures, which are meant to be illustrative, not limiting.

DETAILED DESCRIPTION

Figure 1A:
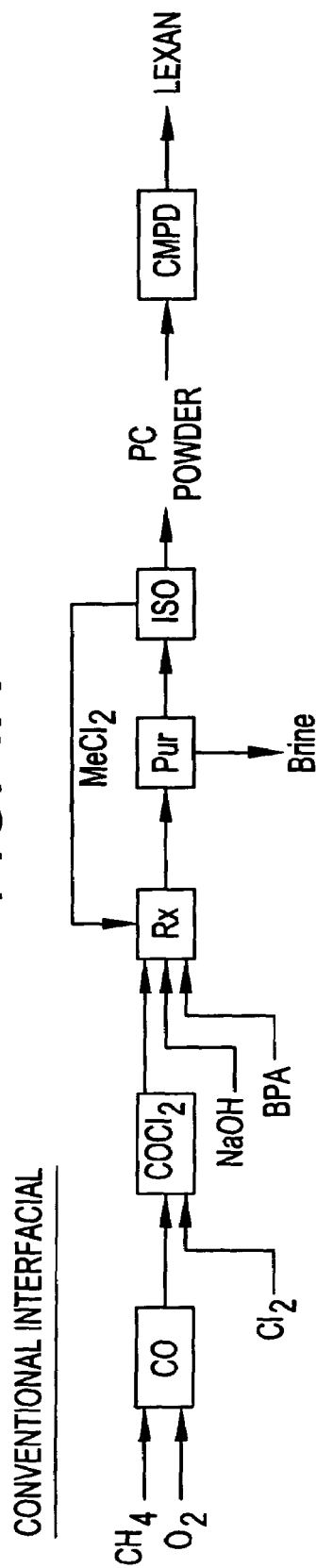
FIG. 1 illustrates three prior art processes for the production of polycarbonate.
Figure 1B:
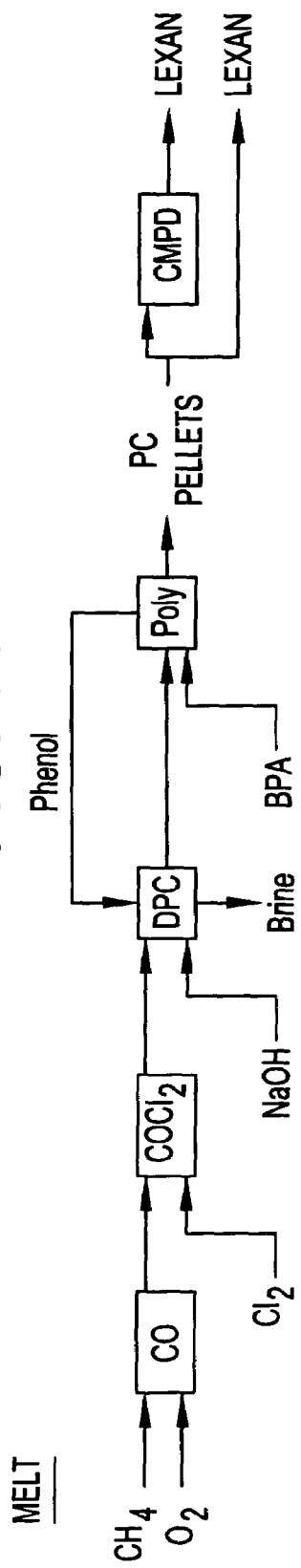
Figure 1C:
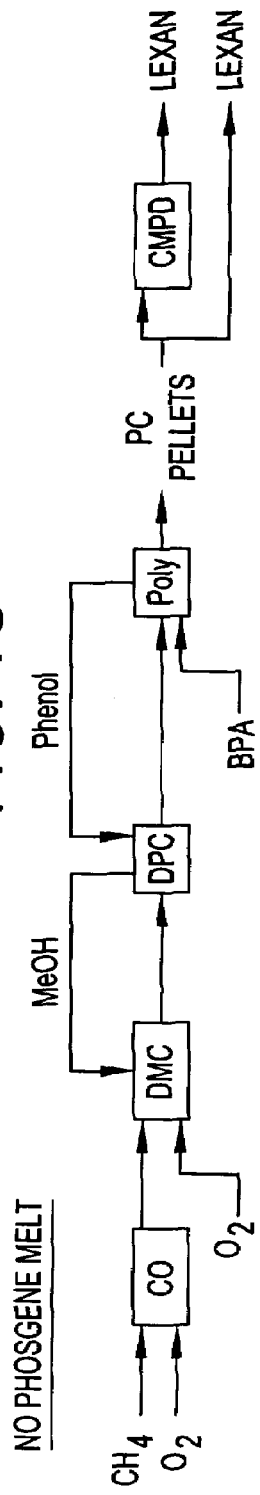
Figure 2:
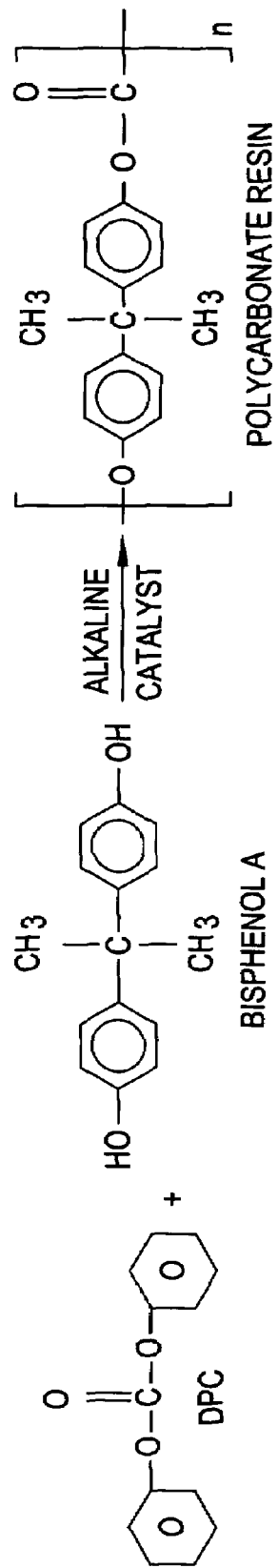
FIG. 2 illustrates a prior art process carried out in a base-catalyzed melt polycondensation reaction.

It has surprisingly been found that fire resistant and transparent polycarbonate extruded products may be obtained by preparing an aqueous solution of the flame retardant salt and compounding this solution with a polycarbonate composition. The resulting extruded sheet products exhibit minimal surface inclusions, reduced color byproducts, and reduced haze levels compared to flame resistant polycarbonate sheet products compounded with flame retardant salts in the solid form.

The flame retardant salt is preferably selected from the group consisting of an alkali metal or alkaline earth metal salt of an aromatic sulfonate, an alkali metal or alkaline earth metal salt of an aromatic sulfone sulphonate, an alkali metal or alkaline earth metal salt of a perfluoroalkyl sulphonate, an alkali metal or alkaline earth metal salt of an aromatic carboxylic acid, and combinations comprising at least one of the foregoing salts. Preferably, the flame retardant salt has a melting temperature greater than the temperatures employed during compounding and extrusion. Generally, the flame retardant salts have a melting temperature greater than 300° C.

The salts of aromatic sulfonates and aromatic sulfone sulfonates for use in the resin compositions can be represented by the following formula (I):

$$[Y'(SO_2)_z]_n Y''(SO_3M)_w \qquad (I)$$

wherein M is a metal which may be selected from the periodic table of either an alkali metal or an alkali earth metal, Y' and Y'' may be either an aryl radical of 1-2 aromatic rings or an aliphatic radical of 1-6 carbon atoms and may be the same or different, z is an integer between 0 or 1, n is an integer between 0 to 5, and w is an integer less than 6. It is to be understood, however, that Y' and Y'' together must contain at least one aromatic ring to which the $SO_3M$ group is attached. For example, salts such as sodium or potassium diphenylsulfon-3-sulphonate. The most preferred aromatic sulfone sulphonate is a potassium salt of diphenylsulfon-3-sulphonic acid (also referred to as "KSS"), which can be represented by the following formula (II).

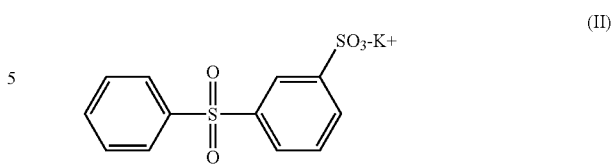

Suitable metal salts of the aromatic carboxylic acid can be represented by the following formula (III)

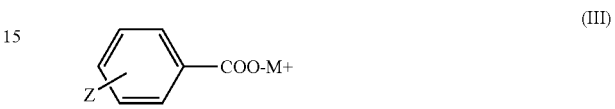

wherein M is a metal which may be selected from the periodic table of either an alkali metal or an alkali earth metal, and Z is a hydrogen, halogen, (e.g., bromine, chlorine, fluorine), an alkyl of 1-6 carbons, and/or an aryl substitution including an aryl radical of 1-2 aromatic rings, wherein each Z may be the same or different. For example, sodium or potassium trichlorobenzoate, sodium or potassium dichlorobenzoate, or the like. It is to be understood, however, that Z must contain at least one halogen.

Suitable metal salts of the aromatic carboxylic acid can be represented by the following formula (IV)

$$CF_3(CF_2)_m(CF_2CF_2O)_n SO_3^- M^+ \qquad (IV)$$

wherein M is a metal which may be selected from the periodic table of either an alkali metal or an alkali earth metal, m is an integer from 1 to 7, and n is an integer from 0 to 7, wherein the order of m and n are interchangeable.

Non-limiting examples of perfluoroalkyl sulphonate metal or alkaline earth metal salts are described in the U.S. Pat. No. 3,775,367, and include, for example, salts such as sodium or potassium, perfluoromethylbutane sulphonate; sodium or potassium perfluoromethane sulphonate; sodium or potassium perfluoroethane sulphonate; sodium or potassium perfluoropropane sulphonate; sodium or potassium perfluorohexane sulphonate; sodium or potassium perfluoroheptane sulphonate; sodium or potassium perfluoroctane_sulphonate; and sodium or potassium perfluorobutane sulfonate; and combinations comprising at least one of the foregoing salts.

The flame retardant salt, and KSS in particular, is preferably present in the final composition in quantities effective to achieve a UL-94 flame resistance rating of V-0 at a sheet thickness of 3.2 millimeters. The particular amount will vary, depending on the molecular weight of the flame retardant salt, the desired flame resistance rating, the amount of the polycarbonate resin present, and possibly other normally flammable ingredients that might also be included in the composition. Generally, effective amounts of flame retardant salt present in the final composition are about 0.001 to about 2.0 parts per hundred by weight, preferably about 0.01 to about 1.0 parts per hundred by weight, and more preferably about 0.03 to about 0.3 parts per hundred by weight based upon the total composition. To achieve these concentrations, it is convenient to produce an aqueous solution wherein the amount of flame retardant salt in the solution is about 5 to about 75% by weight, preferably about 10 to about 50% by weight, and more preferably about 20 to about 30% by weight of the total weight of the solution. In some instances, the maximum amount of flame retardant salt utilized in the solution will be dictated by the solubility of the particular flame retardant salt in water and/or a water-alcohol solution. For example, KSS has a maximum solubility of about 25% at room temperature 21° C. Thus, KSS solutions are preferably prepared at concentrations equal to or less than about 25%. Optionally, alcohol may be employed to aid solubility. A water-alcohol solution is preferred with those salts exhibiting low solubility in water. For example, a 25% by weight solution of potassium perfluorobutane_sulphonate is prepared with about a 42% ethanol/water solution that had been prepared on a volume-by-volume basis.

The polycarbonate component may be made by interfacial processes or by melt transesterification, may be either branched or linear in structure, and may include functional substituents. As used herein, the terms "polycarbonate" and "polycarbonate composition" includes compositions having structural units of the formula (V):

(V)

in which at least about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the formula (VI):

—$A^1$—$Y^1$—$A^2$— (VI)

wherein each of $A^1$ and $A^2$ is a monocyclic divalent aryl radical and $Y^1$ is a bridging radical having one or two atoms which separate $A^1$ from $A^2$. In an exemplary embodiment, one atom separates $A^1$ from $A^2$. Illustrative non-limiting examples of radicals of this type are —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ can be a hydrocarbon group or a saturated hydrocarbon group such as methylene, cyclohexylidene or isopropylidene.

Polycarbonates can be produced by the interfacial reaction of dihydroxy compounds in which only one or two atoms separate $A^1$ and $A^2$. As used herein, the term "dihydroxy compound" includes, for example, bisphenol compounds having general formula (VII) as follows:

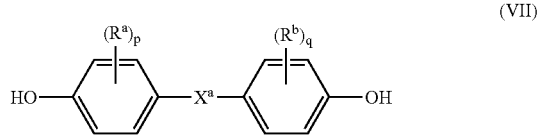
(VII)

wherein $R^a$ and $R^b$ each represent a monovalent hydrocarbon group and may be the same or different; p and q are each independently integers from 0 to 4; and $X^a$ represents one of the groups of formula (VIII):

(VIII)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the dihydroxy-substituted aromatic hydrocarbons disclosed by name or formula (generic or specific) in U.S. Pat. No. 4,217,438, which is incorporated herein by reference. A nonexclusive list of specific examples of the types of bisphenol compounds that may be represented by formula (V) includes the following: 1,1-bis(4-hydroxyphenyl) methane; 1,1-bis(4-hydroxyphenyl) ethane; 2,2-bis (4-hydroxyphenyl) propane (hereinafter "bisphenol A" or "BPA"); 1,1-bis(4-hydroxyphenyl)-3,3,5-trimethylcyclohexane; 1,1-bis(3-methyl-4-hydroxyphenyl) cyclohexane; 2,2-bis(4-hydroxyphenyl) butane; 2,2-bis(4-hydroxyphenyl) octane; 1,1-bis(4-hydroxyphenyl) propane; 1,1-bis(4-hydroxyphenyl) n-butane; bis(4-hydroxyphenyl) phenylmethane; 2,2-bis(4-hydroxy-1-methylphenyl) propane; 1,1-bis(4-hydroxy-t-butylphenyl) propane; bis(hydroxyaryl) alkanes such as 2,2-bis(4-hydroxy-3-bromophenyl) propane; 1,1-bis(4-hydroxyphenyl) cyclopentane; 4,4'-biphenol; and bis(hydroxyaryl) cycloalkanes such as 1,1-bis(4-hydroxyphenyl) cyclohexane; and the like as well as combinations comprising at least one of the foregoing bisphenol compounds.

It is also possible to employ two or more different dihydric phenols or a copolymer of a dihydric phenol with a glycol or with a hydroxy- or acid-terminated polyester or with a dibasic acid or hydroxy acid in the event a carbonate copolymer rather than a homopolymer is desired for use. Polyarylates and polyester-carbonate resins or their blends can also be employed. Branched polycarbonates are also useful, as well as blends of linear polycarbonate and a branched polycarbonate. The branched polycarbonates may be prepared by adding a branching agent during polymerization.

These branching agents are well known and may comprise polyfunctional organic compounds containing at least three functional groups, which may be hydroxyl, carboxyl, carboxylic anhydride, and mixtures thereof. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl) benzene), tris-phenol PA (4(4(1,1-bis(p-hydroxyphenyl)-ethyl) alpha, alpha-dimethyl benzyl)phenol, trimesic acid and benzophenone tetracarboxylic acid. The branching agents may be added at a level of about 0.05 to about 2.0 weight percent based on the total weight of the polycarbonate composition. Branching agents and procedures for making branched polycarbonates are described in U.S. Pat. Nos. 3,635,895 and 4,001,184, which are incorporated by reference. All types of polycarbonate end groups are contemplated as being within the scope of the present disclosure.

Preferred polycarbonates are based on bisphenol A, in which each of $A^1$ and $A^2$ is p-phenylene and $Y^1$ is isopropylidene. Preferably, the average molecular weight of the polycarbonate is in the range of about 5,000 to about 100,000, more preferably in the range of about 10,000 to about 65,000, and most preferably in the range of about 15,000 to about 35,000. Furthermore, the polycarbonate preferably has a melt viscosity rate (MVR) of about 4 to about 30 cm$^3$/10 min, measured at 300° C. under a load of 1.2 kilograms.

Additionally, the polycarbonate composition may include various additives ordinarily incorporated in resin compositions of this type. Such additives are, for example, fillers or reinforcing agents; flame retardants; heat stabilizers; antioxidants; light stabilizers; plasticizers; antistatic agents; mold releasing agents; additional resins; and blowing agents. Examples of fillers or reinforcing agents include glass fibers, asbestos, carbon fibers, silica, talc, and calcium carbonate. Examples of heat stabilizers include triphenyl phosphite, tris-(2,6-dimethylphenyl)phosphite, tris-(mixed mono-and di-nonylphenyl)phosphite, dimethylbenzene phosphonate, tris-(2,4-di-t-butylphenyl)phosphite, and trimethyl phosphate. Examples of antioxidants include octadecyl-3-(3,5-di-tert-butyl-4-hydroxyphenyl)propionate, and pentaerythrityl-tetrakis[3-(3,5-di-tert-butyl-4-hydroxyphenyl)propionate]. Examples of light stabilizers include 2-(2-hydroxy-5-methylphenyl)benzotriazole, 2-(2-hydroxy-5-tert-octyl phenyl)-benzotriazole and 2-hydroxy-4-n-octoxy benzophenone. Examples of plasticizers include dioctyl-4,5-epoxy-hexahydrophthalate, tris-(octoxycarbonylethyl)isocyanurate, tristearin and epoxidized soybean oil. Examples of the antistatic agent include glycerol monostearate, sodium stearyl sulfonate, and sodium dodecylbenzenesulfonate. Examples of mold releasing agents include stearyl stearate, pentaerythritol tetrastearate, beeswax, montan wax and paraffin wax. Examples of other resins include, but are not limited to, polypropylene, polystyrene, polymethyl methacrylate, polybutylene terephthalate, polyethylene terephthalate, polyetherimide, and polyphenylene oxide. Combinations of any of the foregoing additives may be used. Such additives may be mixed at a suitable time during the compounding of the components for forming the composition.

In the practice of the process, an aqueous solution of the flame retardant salt is blended with a finished polycarbonate, preferably in a single or a twin-screw type extruder or similar mixing device well known in the art, which can apply shear to the components. Temperature is preferably raised during compounding and are generally less than 300° C. It is advantageous to apply a vacuum to the melt through at least one or more vent ports in the extruder to remove the water, and alcohol if present, and the volatile impurities in the composition. In this manner, it has been found that colored byproducts can be effectively removed with the use of aqueous solutions of flame retardant salt to render a more transparent product. The pressure is preferably reduced to a pressure less than about 0.8 torr. More preferably, the extruder is pressurized to a pressure within a range from about 0.2 to about 0.6 torr.

Those of ordinary skill in the art will be able to adjust blending times, pressures, and temperatures, as well as additive addition, without undue additional experimentation.

The disclosure is further illustrated by the following non-limiting Examples.

EXAMPLE 1

In this example, flame resistant polycarbonate compositions were prepared according to the formulations listed in Table 1 and compounded in a double screw 6-barrel Leistritz compounder at temperature settings of 40, 200, 260, and 300° C. The pellets were extruded on a Cincinnati extruder at a temperature of about 260 to about 290° C. The extruder included a flexible lips die and produced a polycarbonate sheet having a thickness of about 3 millimeters at an output of about 22 kilograms per hour. A screen pack of 325 mesh was employed to filter large particles from the extrudate. Formulation A contained no flame retardant salt; formulation B contained KSS that had been added in solid form (85% of all particles were smaller than 100 micrometers); and formulation C contained KSS that was added as a 20% aqueous solution. All amounts shown in Table 1 are weight percent based on the total resin weight unless otherwise indicated.

The results, also shown in Table 1, clearly show the surprising advantages of using an aqueous solution of a flame retardant salt compared to polycarbonate compositions compounded with the flame retardant in solid form. A direct comparison of Formulation C (flame retardant in aqueous solution) with Formulation B (flame retardant in solid form) shows about a 100 percent reduction in the number of surface inclusions and haze in the extruded sheet product as a result of using an aqueous solution of the flame retardant. Moreover, as noted by the yellowness index values, colored byproducts are advantageously not present when using the aqueous solution compared to compounding the flame retardant salt in solid form. Comparing the results obtained with Formulation C to Formulation A (polycarbonate without a flame retardant) illustrates that the contribution of water from the aqueous solution of the flame retardant had little or no effect on the polycarbonate sheet product, yet the polycarbonate sheet is now flame resistant with similar values for haze and surface inclusion. It is expected that with the amount of flame retardant salts employed in the formulations (Formulations B and C) shown in Table 1, a UL-94 rating of V-O at a thickness of 3.2 millimeter (mm) can be obtained.

TABLE 1

| COMPONENT | FORMULATION A* | FORMULATION B* | FORMULATION C |
|---|---|---|---|
| Polycarbonate | 87.7 | 87.6 | 7.6 |
| Brominated Polycarbonate | 12 | 12 | 12 |
| UV Stabilizer | 0.2 | 0.2 | 0.2 |
| Heat Stabilizer | 0.1 | 0.1 | 0.1 |
| KSS (neat) | | 0.1 | |
| KSS (20% in water) | | | 0.5 |
| Inclusions per 10 cm$^3$ | 33 | 61 | 29 |
| Yellowness Index | 0.95 | 1.1 | 0.95 |
| Transmission (%) | 90.8 | 90.9 | 90.7 |
| Haze | 0.95 | 1.75 | 0.95 |
| MVR (1.2 kg/ 300° C., cm$^3$/10 minutes) | 6.8 | 7.5 | 8.3 |

*comparative

Inclusions were measured visually by inspecting the surface of the extruded sheet.

Yellowness Index (YI) was measured in accordance with ASTM D1925. Transparency is described by two parameters, percent transmission and percent haze. Percent transmission and percent haze for sheet product produced from the different formulations were determined using ASTM D1003.

Haze measurements were performed on a Gardner XL 835 calorimeter. Before the actual measurement, the spectrophotometer was calibrated versus air. After calibration, haze, YI and percent transmission measurements were performed on 2.5 mm thick chips by placing the samples in the viewport. Three chips of each sample were made and haze measurements were done twice on each of the three chips of a particular sample. The final output provides haze, YI and percent transmission.

Melt volume ratio (MVR) of the formulations was measured on 1.2 kilogram at 300° C. in accordance with ASTM D1238.

Advantageously, the use of an aqueous flame retardant salt solution provides a flame resistant and transparent extruded sheet product exhibiting minimal surface inclusions, reduced color byproducts, and reduced haze levels compared to flame resistant polycarbonate sheet products compounded with flame retardant salts in the solid form. Moreover, the use of aqueous solutions of flame retardant salts permits the use of larger mesh sizes for filtering particles, which advantageously provides higher throughput. A filter screen pack of 325 mesh or smaller is commonly used to filter large particles from the extrudate prepared with flame-retardant slats in the solid form. Because of the relatively small mesh size, the filter screen pack often becomes clogged and creates a pressure drop that affects throughput. Using an aqueous solution of the flame retardant salt permits larger mesh sizes of 100 or greater since particles in the extrudate are minimized. Moreover, cost gains are obtained by the use of aqueous solutions since a spray-drying step is eliminated that it normally utilized to obtain the solid flame retardant salt.

While preferred embodiments have been shown and described, various modifications and substitutions may be made thereto without departing from the spirit and scope of the disclosure. Accordingly, it is to be understood that the present disclosure has been described by way of illustration only, and such illustrations and embodiments as have been disclosed herein are not to be construed as limiting to the claims.

The invention claimed is:

1. A process for producing a fire resistant polycarbonate sheet, comprising:
    compounding an aqueous solution consisting of an organic flame retardant salt with a finished polycarbonate to form a fire resistant polycarbonate, wherein shear is applied during the compounding, and wherein the organic flame retardant salt has a formula:

$[Y'(SO_2)_z]_n Y''(SO_3M)_w$, wherein M is an alkali metal or an alkali earth metal, Y' and Y" are an aryl radical of 1-2 aromatic rings or an aliphatic radical of 1-6 carbon atoms and may be the same or different, z is an integer between 0 or 1, n is an integer between 0 to 5, and w is an integer less than 6, wherein Y' and Y" together must contain at least one aromatic ring to which the $SO_3M$ group is attached; and
    extruding the fire resistant polycarbonate into the fire resistant polycarbonate sheet, wherein a number of surface inclusions in the extruded fire resistant polycarbonate sheet is reduced about 100 percent compared to compounding the flame retardant salt in solid form with the polycarbonate.

2. The process according to claim 1, wherein the organic flame retardant salt is selected from the group consisting of sodium or potassium diphenylsulfon-3-sulphonate; sodium or potassium dichlorobenzoate sulphonate; sodium or potassium trichlorobenzoate sulphonate; sodium or potassium tosylsulfphonate; and combinations comprising at least one of the foregoing salts.

3. The process according to claim 1, wherein the organic flame retardant salt is a sodium or potassium diphenylsulfon-3-sulphonate, or a combination comprising at least one of the foregoing salts.

4. The process according to claim 1, wherein the organic flame retardant salt is potassium diphenylsulfon-3-sulphonate.

5. The process according to claim 1, wherein the fire resistant polycarbonate comprises about 0.001 to about 2.0 parts per hundred of the organic flame retardant salt on a weight basis.

6. The process according to claim 1, wherein the fire resistant polycarbonate comprises about 0.01 to about 1.0 parts per hundred of the organic flame retardant salt on a weight basis.

7. The process according to claim 1, wherein the fire resistant polycarbonate comprises about 0.03 to about 0.3 parts per hundred of the organic flame retardant salt on a weight basis.

8. The process according to claim 1, further comprising compounding additives selected from the group consisting of a filler, a reinforcing agent, a heat stabilizer, an antioxidant, a light stabilizer, a plasticizer, an antistatic agent, a mold releasing agent, an additional resin, a blowing agent, and combinations comprising at least one of the foregoing additives.

9. The process according to claim 1, wherein the organic flame retardant salt has a melting temperature greater than a compounding temperature for forming the fire resistant polycarbonate composition.

10. The process according to claim 1, wherein the aqueous solution comprises water and an alcohol.

11. A process for reducing haze in a fire resistant polycarbonate sheet, comprising:
    compounding an aqueous solution consisting of an organic flame retardant salt with a finished polycarbonate to form a fire resistant polycarbonate, wherein shear is applied during the compounding, and wherein the organic flame retardant salt has a formula:

$[Y'(SO_2)_z]_n Y''(SO_3M)_w$ wherein M is a an alkali metal or an alkali earth metal, Y' and Y" are an aryl radical of 1-2 aromatic rings or an aliphatic radical of 1-6 carbon atoms and may be the same or different, z is an integer between 0 or 1, n is an integer between 0 to 5, and w is an integer less than 6, wherein Y' and Y" together must contain at least one aromatic ring to which the $SO_3M$ group is attached; and
    extruding the fire resistant polycarbonate into the fire resistant polycarbonate sheet, wherein a number of surface inclusions in the extruded fire resistant polycarbonate sheet is reduced about 100 percent compared to compounding the flame retardant salt in solid form with the polycarbonate, and wherein the haze is reduced compared to compounding the flame retardant salt in solid form with the polycarbonate.

12. The process according to claim 11, wherein the flame retardant is selected from the group consisting of sodium or potassium diphenylsulfon-3-sulphonate; sodium or potassium dichlorobenzoate sulphonate; sodium or potassium trichlorobenzoate sulphonate; sodium or potassium tosylsulphonate; and combinations comprising at least one of the foregoing salts.

13. The process according to claim 11, wherein the aqueous solution comprises water and an alcohol.

14. A process for reducing color in a fire resistant polycarbonate sheet, comprising:
    compounding an aqueous solution consisting of an organic flame retardant salt with a finished polycarbonate to form a fire resistant polycarbonate, wherein shear is applied during the compounding, and wherein the organic flame retardant salt has a formula:

$[Y'(SO_2)_z]_n Y''(SO_3M)_w$ wherein M is an alkali metal or an alkali earth metal, Y' and Y" are an aryl radical of 1-2 aromatic rings or an aliphatic radical of 1-6 carbon atoms and may be the same or different, z is an integer between 0 or 1, n is an integer between 0 to 5, and w is an integer less than 6, wherein Y' and Y" together must contain at least one aromatic ring to which the $SO_3M$ group is attached;

applying a vacuum to at least one extruder vent port during the compounding; and extruding the fire resistant polycarbonate into the fire resistant polycarbonate sheet, wherein a number of surface inclusions in the extruded fire resistant polycarbonate sheet is reduced about 100 percent compared to compounding the flame retardant salt in solid form with the polycarbonate, and wherein a yellowness index is reduced compared to compounding the flame retardant salt in solid form with the polycarbonate.

15. The process according to claim 14, wherein the flame retardant is selected from the group consisting of sodium or potassium diphenylsulfon-3-sulphonate; sodium or potassium dichlorobenzoate sulphonate; sodium or potassium trichlorobeazoate sulphonate; sodium or potassium tosylsulphonate; and combinations comprising at least one of the foregoing salts.

* * * * *